United States Patent [19]

Jun et al.

[11] Patent Number: 5,451,752

[45] Date of Patent: Sep. 19, 1995

[54] NOISE SHIELDING APPARATUS FOR MAGNETRON OF MICROWAVE OVEN

[75] Inventors: Wookeum Jun; Byeongjun Kim, both of Incheon; Wonpyo Hong, Kyungki-Do; Sangjin Kim, Incheon; Byungkap Lim, Seoul; Heungdae Kang, Incheon; Jaewon Cho, Seoul, all of Rep. of Korea

[73] Assignee: Daewoo Electronics Co., Ltd., Seoul, Rep. of Korea

[21] Appl. No.: 357,010

[22] Filed: Dec. 16, 1994

[30] Foreign Application Priority Data

May 27, 1994 [KR] Rep. of Korea ............... 94-11651
Jun. 28, 1994 [KR] Rep. of Korea ............... 94-15055

[51] Int. Cl.6 ........................ H01B 6/64; H01G 4/42
[52] U.S. Cl. ........................ 219/761; 219/738; 361/302; 315/39.51
[58] Field of Search ............... 219/761, 736, 738; 361/302, 330; 315/39.51, 39.53; 174/35 R

[56] References Cited

U.S. PATENT DOCUMENTS

| 4,370,698 | 1/1983 | Sasaki ............... | 361/302 |
| 4,811,161 | 3/1989 | Sasaki et al. ...... | 361/302 |
| 4,814,938 | 3/1989 | Arakawa et al. ... | 361/302 |
| 5,142,436 | 8/1992 | Lee et al. .......... | 361/302 |
| 5,206,786 | 4/1993 | Lee ................... | 361/302 |
| 5,313,139 | 5/1994 | Yoon ................. | 315/39.51 |

FOREIGN PATENT DOCUMENTS

0364755A3 9/1989 European Pat. Off. .

*Primary Examiner*—Philip H. Leung
*Attorney, Agent, or Firm*—Lowe, Price, LeBlanc & Becker

[57] ABSTRACT

A noise shielding apparatus for the magnetron of a microwave oven for preventing the lowering of the voltage resistance of the capacitor due to the poor concentricity and the poor interfacial state is disclosed. A shielding case has a side wall with an elliptic opening and a projected portion along the elliptic opening by bending out a circumference portion thereof. The capacitor includes an elliptic cylindrical ceramic dielectric, separate electrodes separately formed on an upper surface of the ceramic dielectric and a common electrode formed on a lower surface of the ceramic dielectric. Through conductors pass through the through holes and are connected to a choke coil of the magnetron. Each of through conductors is provided with an electrode connection portion for electrically connecting with the separate electrodes integrally and horizontally formed from around an upper portion of each of through conductors. An insulation lattice is formed at a central upper portion of the insulation case over a border line of the separate electrodes. Forming the electrode connection portion prevents the poor perpendicularity and/or poor interfacial state. Providing the insulation lattice solves simply and stably the insulation problem between fastening tabs and thus the magnetron may be stably operated.

15 Claims, 14 Drawing Sheets

NOISE SHIELDING APPARATUS FOR MAGNETRON OF MICROWAVE OVEN

BACKGROUND OF THE INVENTION

1. Field of the Invention

The present invention relates to a noise shielding apparatus in which a noise generated in a magnetron of a microwave oven can be effectively shielded. More particularly, the present invention relates to a noise shielding apparatus in which the structure of the shielding apparatus is simple, but the performance is very high, so that the productivity can be improved, and that the overall manufacturing cost can be saved. The present invention is an improvement over the invention which is the subject matter of one of the present inventor's co-pending U.S. patent application Ser. No. 08/307,129 filed on Sep. 16, 1994 (European Patent Application No. 94 114 731.6 filed on Sep. 19, 1994), the disclosure of which is hereby incorporated into this application by reference.

2. Prior Arts

Generally, various apparatuses such as home microwave ovens, commercial thawing apparatuses, industrial driers and the like using microwaves are provided with a magnetron for generating microwaves, and a capacitor for shielding noises.

In an electric field room of a microwave oven, there is provided a magnetron for generating microwaves. Such microwaves are generated when a high voltage produced by primary and secondary induction coils of a high voltage transformer which is attached on a base plate of the electric field room, is stably supplied to the magnetron, the high voltages being generated through the inductive interaction between the induction coils. Such microwaves are irradiated into a cooking chamber through an irradiating tube.

When the microwaves are irradiated into the cooking chamber after passing through the irradiating tube, the food placed within the cooking chamber is heated so as to be cooked.

The power supply line of the magnetron mainly consists of a filament, a cathode and an anode. When the high voltage is supplied to the magnetron to generate microwaves, unnecessarily radiated microwaves, i.e., noises are generated, besides microwaves having basic frequencies which are suitable for heating the food. Then, the noises flow back through the filament and the cathode so as to cause wave obstructions in the nearby apparatuses.

Particularly, coming recently, television broadcasts resorting to satellites are widely utilized. The unnecessary microwaves of the magnetron interacts with the broadcasting frequencies and therefore there is a possibility that receiving disorders may occur on a television receiver.

In order to reduce such adverse influences given to the nearby apparatuses due to the magnetron noise, a choke coil and a capacitor connected thereto are provided on the cathode which supplies power to the filament. The choke coil which has a reactance, and the capacitor which is connected to the choke coil absorb the unnecessary microwaves, thereby blocking the leakage of the unnecessary microwaves.

The choke coil is sealed within a shielding case which is provided under the magnetron, while the capacitor is installed on the outside of the shielding case. One end of the choke coil is connected to the power supply line of the filament, while the other end is connected to a lead line of the capacitor.

The widely used capacitor is a through-type, and such a through-type capacitor is described in U.S. Pat. No. 4,811,161 (issued to Sasaki et al). In the magnetron using the through-type capacitor, the choke coil is connected in series between the cathode of the magnetron and a through conductor of the through-type capacitor which is inserted in a side wall of the shielding case.

FIG. 1 is an exploded perspective view of a noise shielding apparatus including a conventional through-type capacitor 30 and FIG. 2 is a front sectional view of through-type capacitor 30 of FIG. 1.

As shown in the drawings, the conventional through-type capacitor 30 includes an elliptic ceramic dielectric 32. Ceramic dielectric 32 is provided with a pair of vertical through holes 34 which are formed in parallel with each other. On the upper surface of ceramic dielectric 32, there are provided a pair of electrodes 36 which are separated from each other, while a common electrode 38 is provided on the lower surface of ceramic dielectric 32. Separate electrodes 36 and common electrode 38 are provided with through holes corresponding to through hole 34 of ceramic dielectric 32. Capacitor 30 further includes a ground fitment 40 made of a metal in which an elliptic opening 42 is formed at a center portion thereof, on which there is formed an upstand 44 along the circumference of opening 42 with a suitable height. Ceramic dielectric 32 is fixed via common electrode 38 on upstand 44 of ground fitment 40 by a proper means such as soldering or the like.

Further, capacitor 30 includes a pair of through conductors 46 each covered with an insulation tube 48, insulation tube 48 being formed of a suitable material such as silicon. Insulation tubes 48 are inserted into through holes 34, and opening 42 and through conductors 46 each are fittedly secured in an electrode connectors 50 each of which is fixed on separate electrodes 36 by a proper means such as soldering or the like. Fixing of through conductors 46 to electrode connectors 50 may be carried out by soldering or the like.

Ground fitment 40 is formed by pressing a metal plate in such a manner that upstand 44 should surround opening 42 in a projected contour, and that the other side of ground fitment 40 is provided with a recess 52 so as to form the inner surface of upstand 44. At the four corner portions of ground fitment 40, there are formed four piercing holes 41, so that ground fitment 40 may be attached to a shielding case (which is also called a "filter box") 90.

Capacitor 30 further includes an insulation case 54 which surrounds ceramic dielectric 32 and an insulation cylinder 56 which surrounds through conductors 46. The lower portion of insulation case 54 is secured to upstand 44 of ground fitment 40, while the upper portion of insulation cylinder 56 is secured by recess 52 of ground fitment 40. Insulation case 54 and insulation cylinder 56 are filled with a first and second insulation resin materials 58 and 60 comprised of an insulation material such as an epoxy resin or the like so as to cover an outside and inside of ceramic dielectric 32 with the resin or embed it therein to thereby ensure moisture proofness and insulation properties of ceramic electric. Insulation case 54 and insulation cylinder 56 are made of a thermoplastic resin such as polybutylene terepthalate (PBT).

Each of through conductors 46 is integrally provided with a fastening tab 62 on one end thereof which is to be received into insulation case 54 for applying a high voltage. One end of fastening tab 62 projects from one end of insulation case 54, so that the tab can be easily connected to an external terminal.

When ground fitment 40 is fixedly secured on shielding case 90, shielding case 90 is provided with a large hole 91 corresponding to the capacitor and four bearing holes 92 corresponding to four piercing holes 41 of ground fitment 40. Then bearing holes 92 and piercing holes 41 are matched to assemble them using bolts or a caulking process.

FIG. 3 is a partial sectional view for illustrating a magnetron having a conventional through-type capacitor. In the drawing, reference numeral 500 denotes a magnetron for generating a microwave, reference numeral 501 denotes an antenna rod, reference numeral 502 denotes a cathode stem, reference numeral 503 denotes a cathode terminal and reference numeral 504 denotes a choke coil wound on an inductor. Choke coil 504 is connected in series between cathode terminal 503 and through conductors 46 of capacitor 30.

When a microwave noise which is generated from magnetron 500 flows in reverse, the microwave noise passes through choke coil 504 via cathode terminal 503 which is connected to the filament of magnetron 500, with the result that a portion of the noise is offset owing to the reactance of choke coil 504. The rest of the microwave noise passes through through conductors 46 which are connected to choke coil 504, and during this passing, a portion thereof is dissipated by through-type capacitor 30 which includes ceramic dielectric 32 (in which through conductors 46 are inserted). The last remaining portion of the noise is completely dissipated by being grounded to shielding case 90 which is connected with common electrode 38.

Through-type capacitor 30 which connects choke coil 504 of the interior of shielding case 90 with an external terminal inhibits the conducting noise from conducting through the lead, and also shields a radiating noise. However, as shown in the drawings, the conventional noise shielding apparatus of a magnetron includes many components assembled together, and therefore, not only the structure is complicated so as to increase the material cost, but also the assembling process is very fastidious so as to lower the productivity. Further, after the assembling, a considerable amount of radiating waves is leaked through insertion hole 91 of shielding case 90, holes 41 of ground fitment 40 and burring holes 92 of shielding case 90, with the result that the shielding of the noise cannot be maximized.

FIGS. 4A and 4B are a partial front view and a partial sectional side view for explaining the noise leakage in a noise shielding apparatus having a conventional through-type capacitor. As shown in FIG. 4B, it can be seen that a noise such as unnecessary radiating wave 400 which flows in reverse to cathode terminal 503 of magnetron 500 leaks through burring holes 92 or the gap formed by the interface between shielding case 90 and ground fitment 40.

In the meantime, Wookeum Jun, one of the present inventors suggested an integral capacitor of a magnetron for a microwave oven which has a relatively simple structure to reduce the material cost and to improve the productivity. The capacitor is disclosed in an U.S. patent application Ser. No. 08/307,129 filed on Sep. 16, 1994 (European Patent Application No. 94 114 731.6 filed on Sep. 19, 1994), which is now pending.

FIG. 5 is an exploded perspective view of a capacitor disclosed in the above U.S. patent application and FIG. 6 is a front sectional view of the noise shielding apparatus of FIG. 5.

A through-type capacitor 130 as shown in FIGS. 5 and 6 is similar to the conventional capacitor. Capacitor 130 includes an elliptic ceramic dielectric 132, and ceramic dielectric 132 is provided with a pair of vertical through holes 134 which are substantially parallel with each other. Further, a pair of mutually separate electrodes 136 are provided on the top of ceramic dielectric 132, while a common electrode 138 is provided on the bottom of the ceramic dielectric 132. Separate electrodes 136 and common electrode 138 are provided with through holes corresponding to through holes 134 of ceramic dielectric 132.

Capacitor 130 is secured to a shielding case 100 which is provided with an elliptic opening 111 at a center portion of a side wall thereof for receiving capacitor 130. Further, an opening 200 is formed at a center portion of an upper portion of shielding case 100 for receiving the cathode of a magnetron, while the lower portion of shielding case 100 is totally open. A projected portion 110 is formed with a proper height around opening 11 by protrudingly bending a circumference portion of opening 111. On an inner surface portion of shielding case 100, a recess 113 is formed corresponding to projected portion 110. Around projected portion 110 and on the surface portions of shielding case 100, there are formed reinforcing ribs 112 for reinforcing the strength of shielding case 100.

Ceramic dielectric 132 is secured to projected portion 110 of shielding case 100 by fixing common electrode 138 to projected portion 110 by a proper means such as soldering or the like.

Capacitor 130 includes a pair of through conductors 146 each surrounded by an insulation tube 148 which is made of a proper material such as silicon. Through conductors 146 are disposed at a center portion of shielding case 100, and are connected to a choke coil which is connected to the filament of the magnetron, connecting through conductors 146 with the filament being made by a proper means such as soldering or the like. Insulation tubes 148 are inserted into through holes 134, and opening 111 and through conductors 146 are fixed to electrode connectors 150 which are secured on separate electrodes 136. Fixing through conductors 146 on electrode connectors 150 can be performed by a proper means such as soldering or the like.

Capacitor 130 also includes an insulation case 154 and an insulation cylinder 156. The lower portion of insulation case 154 which surrounds ceramic dielectric 132 is secured on projected portion 110, while the upper portion of insulation cylinder 156 which surrounds through conductors 146 is secured in recess 113 of shielding case 100. Insulation case 154 and insulation cylinder 156 are filled with an insulation resin such as an epoxy resin so as to cover an outside and inside of ceramic dielectric 132 to thereby ensure its moisture proofness and its insulation properties. Insulation case 154 and insulation cylinder 156 are formed of a thermoplastic resin such as PBT.

Each of through conductors 146 is integrally provided with a fastening tab 162 to which a high voltage is applied. Fastening tab 162 is received into insulation case 154, so that an end portion of fastening tab 162 would project from insulation case 154, thereby making it easy to be connected to an external terminal.

In the case where the above noise shielding apparatus is used, if a microwave noise which is generated from the magnetron flows in reverse, the microwave noise passes through a choke coil (not shown) which is connected to the filament of the magnetron, with the result that a portion of the noise is offset owing to the reactance of the choke coil. The rest of the microwave noise passes through through conductors 146 which are connected to the choke coil, and during this passing, a portion thereof is dissipated by capacitor 130 which includes ceramic dielectric 132 (in which through conductors 146 are inserted). The last remaining portion of the noise is completely dissipated by being grounded to shielding case 100 which is connected with the common electrode 138.

In the above capacitor, shielding case 100 is punched and bent so as to form the projected portion 110 around opening 111. Projected portion 110 performs the role of the conventional ground fitment (40 in FIG. 1) which is fixedly installed on the shielding case.

Since projected portion 110 effectively performs the role of the conventional ground fitment 40, a separate ground fitment is unnecessary. Therefore, the material cost is saved, and a working process for installing ground fitment 40 is unnecessary, thereby improving the productivity.

Further, the microwave noise which is generated by the magnetron is continuously dissipated by the ceramic dielectric during passing through through conductors 146 which are inserted in ceramic dielectric 132. Then, the noise is completely dissipated by being grounded to shielding case 100 which is connected to common electrode 138. In the above capacitor, when compared to a conventional capacitor, projected portion 110 which performs the role of the conventional ground fitment is integrally formed on shielding case 100. Therefore, the surface of common electrode 138 of ceramic dielectric 132 directly contacts with the surface of projected portion 110, and therefore, the grounding resistance is reduced. Therefore, the microwave noise is effectively grounded to shielding case 100 so as to be completely dissipated.

When using the conventional through-type capacitor or the Jun's capacitor, the through conductors, the electrode connectors and the fastening tabs are separately formed. When manufacturing a capacitor by assembling these components, after perpendicularly fixing an electrode connector to a through conductor, the through conductor is inserted in the through hole of the ceramic dielectric. Then, an insulation resin material is filled in the through hole. In such a case, due to many components of the capacitor, the assembling work is increased to lower the productivity.

Further, when the concentricity of the electrode connector and the through conductor are not coincident, it is difficult to maintain the perpendicularity of the through conductors with respect to the ceramic dielectric in the through holes. FIG. 7A is a view for illustrating the state that through conductors 146 of Jun's capacitor do not maintain the perpendicularity so that each of through conductors 146 is inclined at an angle of $\theta$ with respect to the central axis of through hole 134. This is due to the poor perpendicularity of each of through conductors 146 with respect to electrode connector 150 as shown "A" in FIG. 7A. In such a case, the thickness of the insulation resin material filled between the inner surface of through holes 134 and through conductors 146 is not uniform (that is, the thickness of the portio "B" is thinner than the other portions), thereby lowering the voltage resistance of the capacitor and providing a poor appearance as well.

Further, there is possibility that a gap may be formed between the electrode connectors and the separate electrodes so that the interfacial state therebetween becomes poor. FIG. 7B shows the poor interfacial state generated by the gap "G" between electrode connector 150 and separate electrodes 136. In such a case, the capacitance of the capacitor is varied so that the voltage resistance of the capacitor is lowered. Further, there is a difficulty in filling the first and second insulation resin materials in the above insulation case and insulation cylinder.

SUMMARY OF THE INVENTION

The present invention is intended to overcome the above described disadvantages. That is, it is an object of the present invention to provide a noise shielding apparatus for the magnetron of a microwave oven, in which the lowering of the voltage resistance and the capacitance of the capacitor due to the poor concentricity and the poor interfacial state may be prevented.

Another object of the present invention is to provide a noise shielding apparatus for the magnetron of a microwave oven, in which the structure is relatively simple, so that the material cost would be saved, and that the productivity would be improved.

For achieving the above object, the noise shielding apparatus according to the present invention includes:
a shielding case having a side wall with an elliptic opening and having a projected portion formed along the elliptic opening by bending out a circumference portion of the elliptic opening, and a recess formed on an inner surface thereof corresponding to the projected portion;
an elliptic cylindrical ceramic dielectric having a size corresponding to the elliptic opening of the shielding case, and having a pair of through holes;
a pair of separate electrodes separately formed on an upper surface of the ceramic dielectric;
a common electrode formed on a lower surface of the ceramic dielectric and oppositely from the separate electrodes;
a pair of through conductors passing through the through holes and connected to a choke coil of the magnetron, each of the through conductors being provided with an electrode connection portion for electrically connecting with the separate electrodes, the electrode connection portion being integrally and horizontally formed from around an upper portion of each of the through conductors;
an insulation case with a lower portion secured on the projected portion of the shielding case for surrounding the ceramic dielectric; and
an elliptic insulation cylinder with its upper portion secured in the recess of the shielding case for surrounding the through conductors.

In accordance with one embodiment of the present invention, the electrode connection portion is formed in a ring shape along a periphery of each of the through conductors by horizontally extending from each of the through conductors. Preferably, a recessed portion is formed on a bottom of the electrode connection portion for stably filling into the through holes and the recessed portion is formed between each of the through conductors and an outer periphery of the electrode connection portion. Also, a bending portion is preferably formed at the outer periphery of the electrode connection portion for increasing a contact area between the electrode connection portion and the separate electrodes and for improving a stable perpendicularity of the through conductors.

According to another embodiment of the present invention, an insulation lattice is formed at a central upper portion of the insulation case over a border line of the separate electrodes.

The present invention further provides a noise shielding apparatus for a magnetron, comprising:

- a shielding case having a side wall with an elliptic opening and having a projected portion formed along the elliptic opening by bending out a circumference portion of the elliptic opening, and a recess formed on an inner surface thereof corresponding to the projected portion;
- an elliptic cylindrical ceramic dielectric having a size corresponding to the elliptic opening of the shielding case, and having a pair of through holes;
- a pair of separate electrodes separately formed on an upper surface of the ceramic dielectric;
- a common electrode formed on a lower surface of the ceramic dielectric and oppositely from the separate electrodes;
- a pair of through conductors passing through the through holes and connected to a choke coil of the magnetron, each of the through conductors being provided with an electrode connection portion for electrically connecting with the separate electrodes, the electrode connection portion being integrally and horizontally formed from around an upper portion of each of the through conductors, the electrode connection portion having a recessed portion formed on a bottom of the electrode connection portion for stably filling into the through holes, the recessed portion being formed between each of the through conductors and an outer periphery of the electrode connection portion;
- an insulation case with a lower portion secured on the projected portion of the shielding case for surrounding the ceramic dielectric;
- an elliptic insulation cylinder with its upper portion secured in the recess of the shielding case for surrounding the through conductors;
- a first insulation resin material filled within the insulation case so as to surround the ceramic dielectric;
- a second insulation resin filled in an upper portion of the insulation cylinder so as to surround the through conductors;
- a fastening tab formed on an upper portion of each of the through conductors for being connected to an external terminal, and the fastening tab being extended outside of the insulation case; and
- a pair of insulation tubes surrounding a pair of the through conductors, respectively. Preferably, the insulation tubes are buried with the second insulation resin material. An insulation lattice may be formed at a central upper portion of the insulation case over a border line of the separate electrodes. Here, the lower end of the insulation lattice is buried with the first insulation resin material. Further, the insulation lattice is preferably formed between a pair of the fastening tabs so as to have an upper end with a height higher than the height of the fastening tabs.

The shielding case is protrudingly bent so as to form a projected portion around the opening. Since a separate ground fitment is unnecessary, the material cost is saved, and a working process for installing the ground fitment is unnecessary, thereby improving the productivity.

Further, in replacement of the electrode connector an electrode connection portion is integrally formed with the through conductors, which prevents the poor perpendicularity and/or poor interfacial state which arise when assembling a separate electrode connecter with the through conductors. Providing the insulation lattice solves simply and stably the insulation problem between fastening tabs and thus the magnetron may be stably operated.

The microwave noise which is generated by the magnetron is continuously dissipated by the ceramic dielectric during passing through through conductors which are inserted in the ceramic dielectric. The noise is completely dissipated by being grounded to shielding case 201 which is connected to common electrode.

In the present invention, since the conventional holes for securing the ground fitment to the shielding case are unnecessary, the leakage of the microwave noise through the four holes of the shielding case is prevented.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

Hereinafter, the present invention will be described in detail referring to the accompanying drawings.

Figure 8:
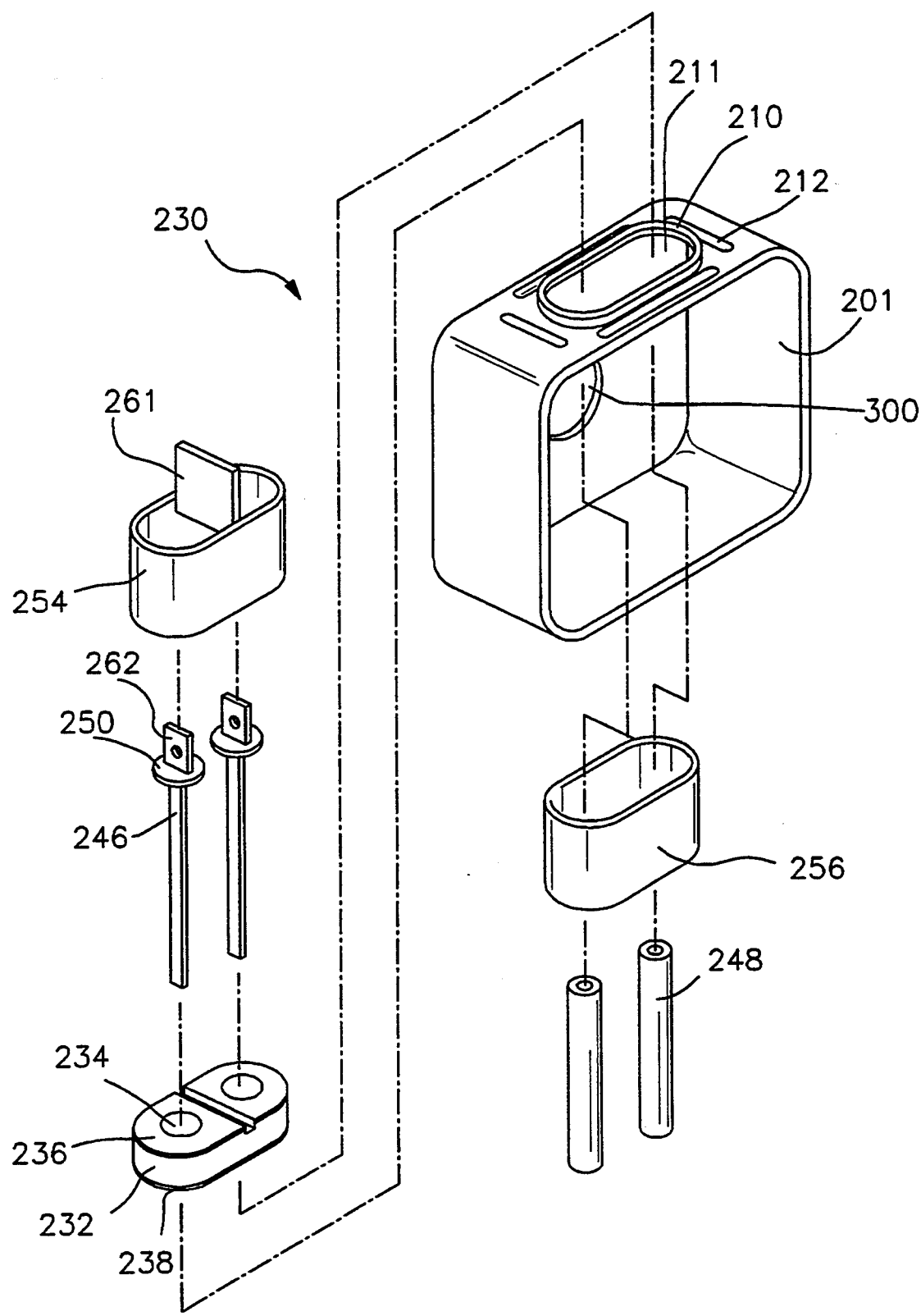
FIG. 8 is an exploded perspective view of a noise shielding apparatus for a magnetron according to one embodiment of the present invention.
Figure 9:
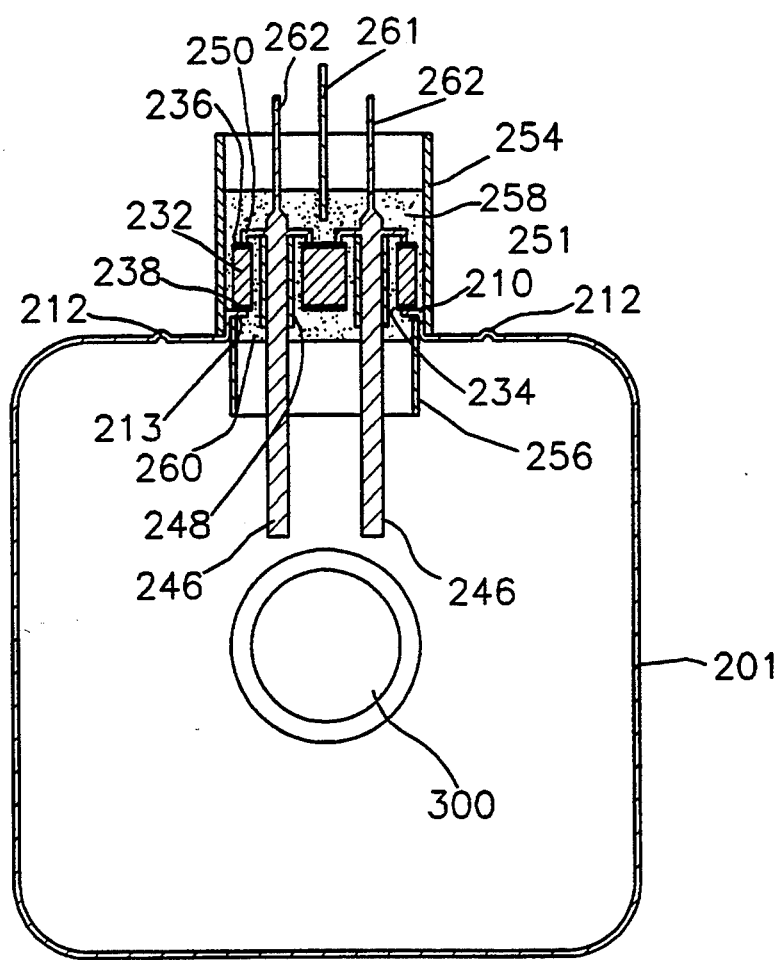
FIG. 9 is a front sectional view for illustrating the combined state of the noise shielding apparatus of FIG. 8.
Figure 10:
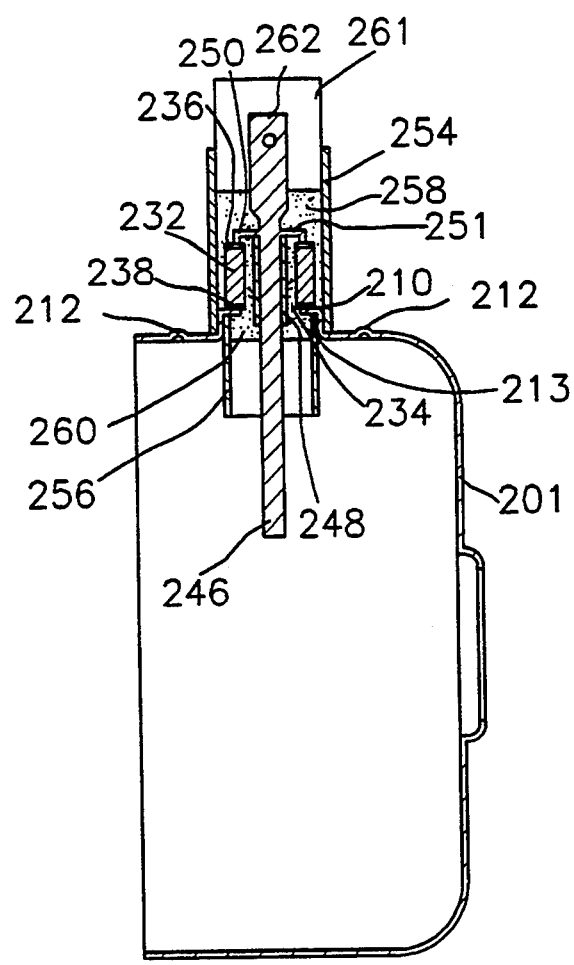
FIG. 10 is a side sectional view for illustrating the combined state of the noise shielding apparatus of FIG. 8.
Figure 11:
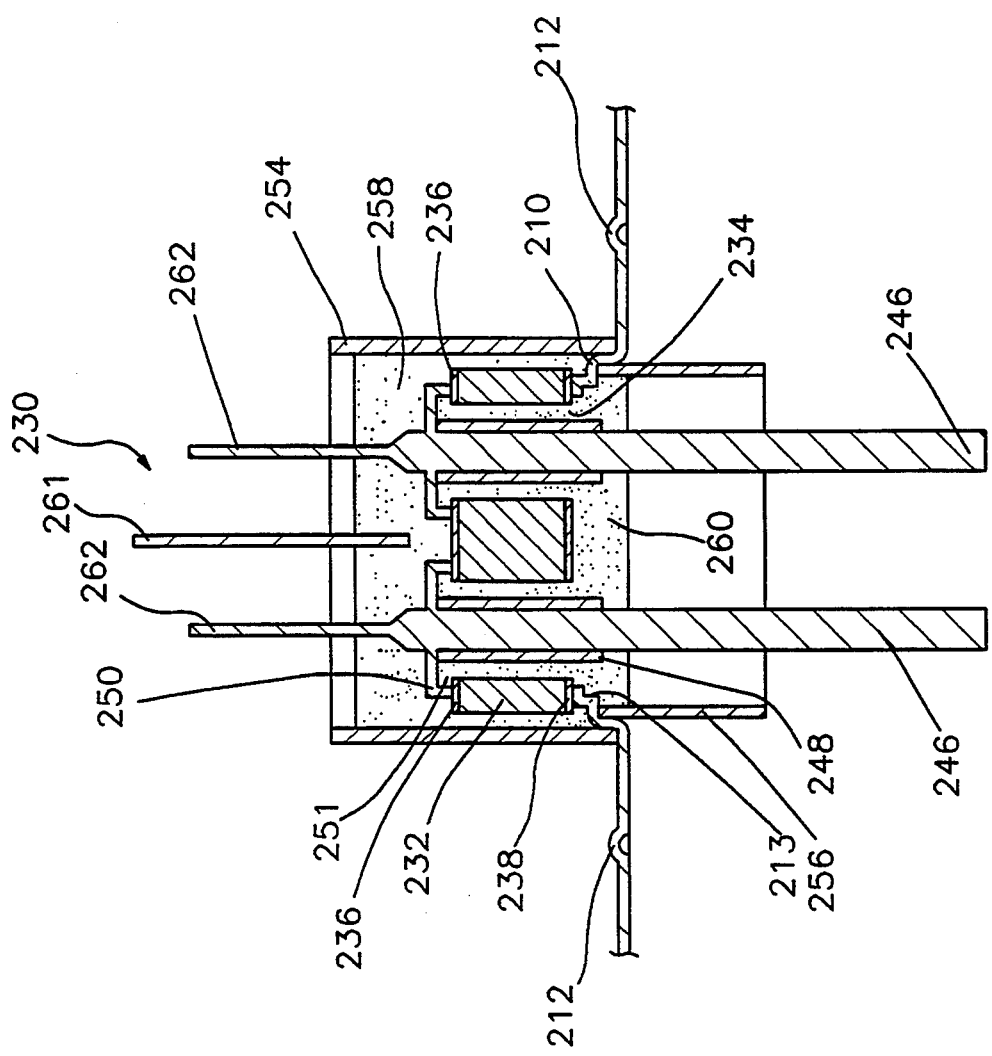
FIG. 11 is an enlarged sectional view enlarging the capacitor portion of FIG. 9.

FIG. 8 is an exploded perspective view of a noise shielding apparatus for a magnetron according to one embodiment of the present invention, FIG. 9 is a front sectional view for illustrating the combined state of the noise shielding apparatus of FIG. 8, FIG. 10 is a side sectional view for illustrating the combined state of the noise shielding apparatus of FIG. 8 and FIG. 11 is an enlarged sectional view enlarging the capacitor portion of FIG. 9.

The shown noise shielding apparatus includes a through-type capacitor 230 which is similar to the conventional capacitor. Capacitor 230 includes an elliptic ceramic dielectric 232, and ceramic dielectric 232 is provided with a pair of vertical through holes 234 which are substantially parallel with each other. Further, a pair of mutually separate electrodes 236 are provided on the top (the upper surface) of ceramic dielectric 232, while a common electrode 238 is provided on the bottom (the lower surface) of ceramic dielectric 232. Separate electrodes 236 and common electrode 238 are provided with the through holes corresponding to through holes 234 of ceramic dielectric 232.

Capacitor 230 is secured to a shielding case 201 which is provided with an elliptic opening 211 at a center portion of a side wall thereof for receiving capacitor 230. Further, an opening 300 is formed at a center portion of an upper portion of shielding case 201 for receiving the cathode terminal of a magnetron, while the lower portion of shielding case 201 is totally open. A projected portion 210 is integrally formed with a proper height around opening 211 by protrudingly bending a circumference portion of opening 211. On an inner surface portion of shielding case 201, a recess 213 is formed corresponding to projected portion 210. Around projected portion 210 and on the surface portions of shielding case 201, there are formed reinforcing ribs 212 for reinforcing the strength of shielding case 201.

Ceramic dielectric 232 is secured to projected portion 210 of shielding case 201 by fixing common electrode 238 to projected portion 210 by a proper means such as soldering or the like. The surface of common electrode 238 is directly contacted with the surface of projected portion 210 of shielding case 201 so that the ground resistance is reduced. At this time, the surface of projected portion 210 of shielding case 201 or the whole upper surface of shielding case 201 including projected portion 210 is preferably plated with tin. In such a case, when common electrode 242 is fixed by soldering, the binding force increases and the contact resistance can be minimized so that the capacitor's function is increased.

Capacitor 230 includes a pair of through conductors 246 each surrounded by an insulation tube 248 which is made of a proper material such as silicon. Through conductors 246 are disposed at a center portion of shielding case 200, and are connected to a choke coil which is connected to the filament of the magnetron, and connecting through conductors 246 with the filament can be performed by a proper means such as soldering or the like.

Each of through conductors 246 is integrally provided with each of fastening tabs 262 to which a high voltage is applied. Fastening tabs 262 are received into insulation case 254, so that an end portion of fastening tabs 262 would project from insulation case 254, thereby making it easy to be connected to an external terminal.

Figure 5:
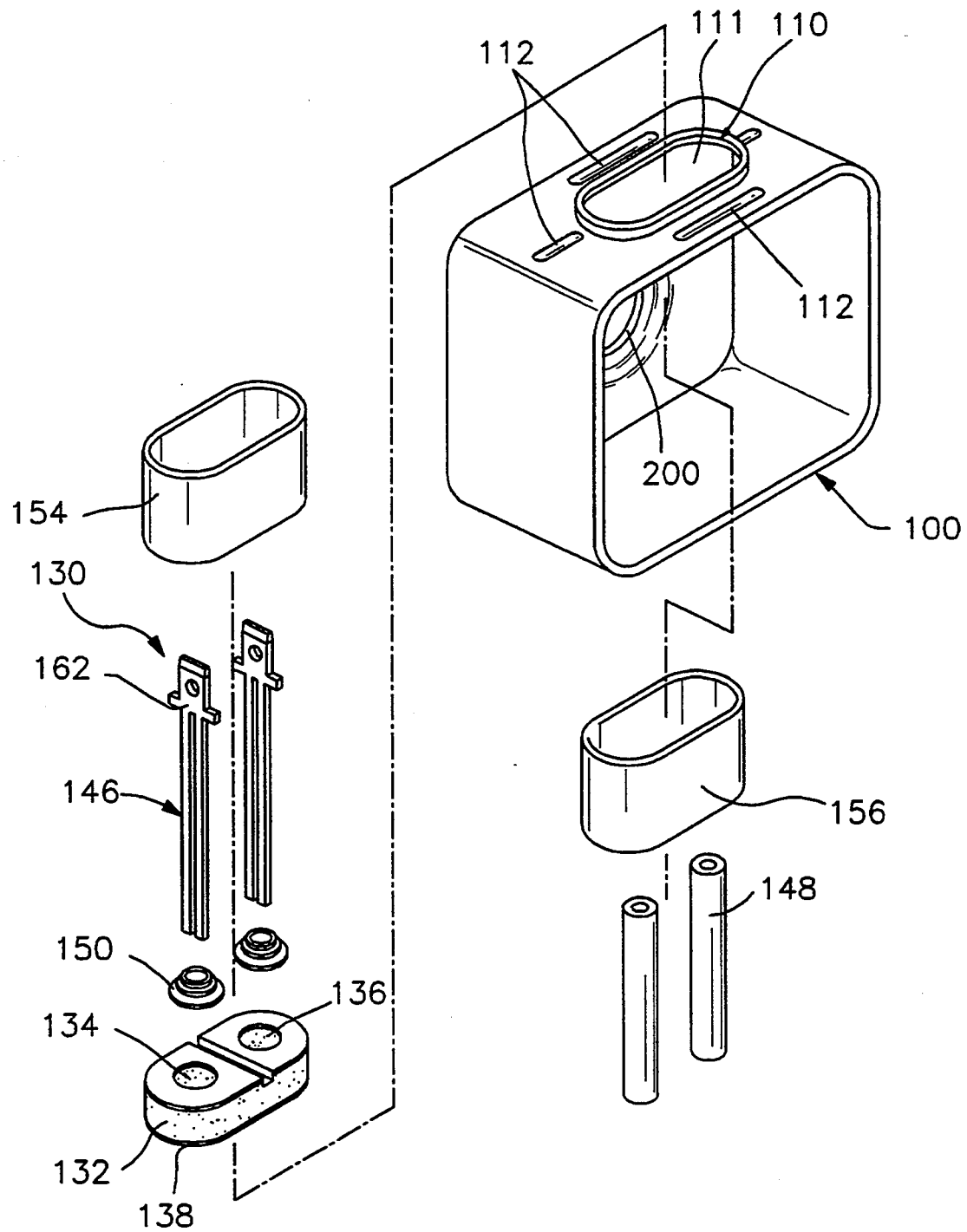
FIG. 5 is an exploded perspective view of a capacitor disclosed in the prior U.S. patent application.
Figure 6:
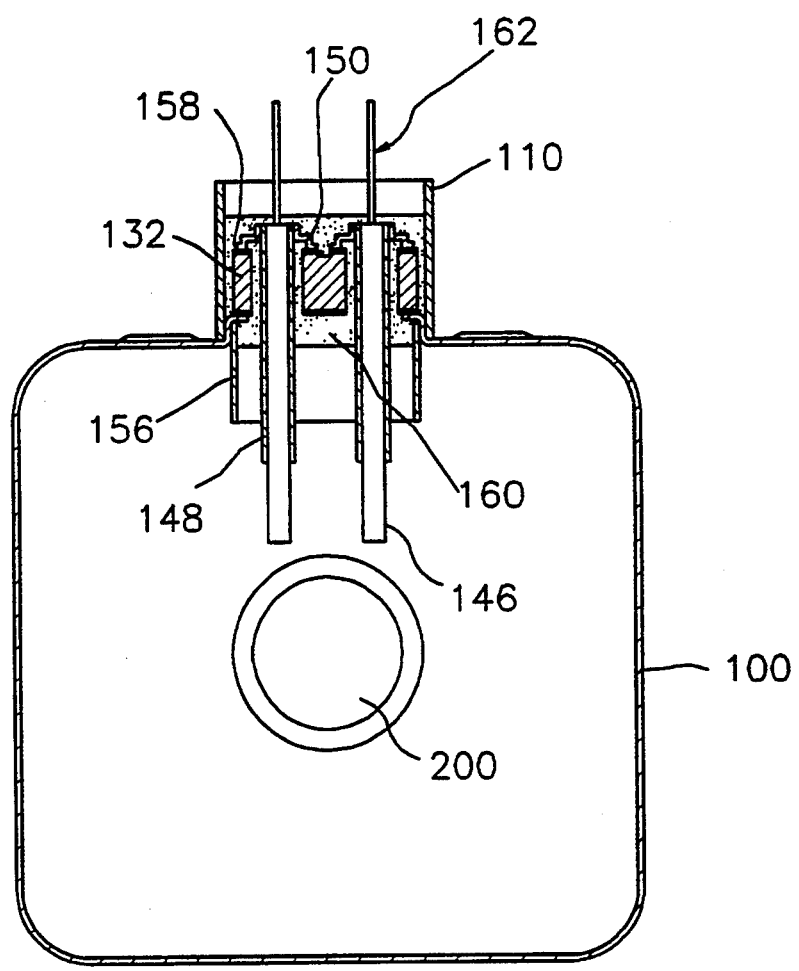
FIG. 6 is a front sectional view of the noise shielding apparatus of FIG. 5.
Figure 7A:
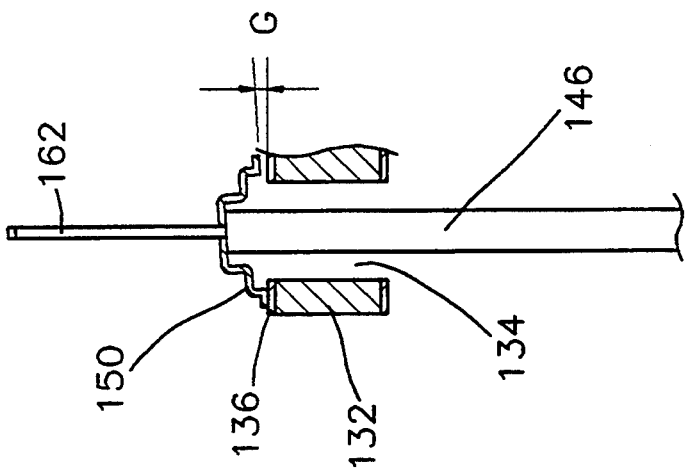
FIG. 7A is a view for illustrating the state that the through conductor of Jun's prior capacitor does not maintain the perpendicularity.
Figure 7B:
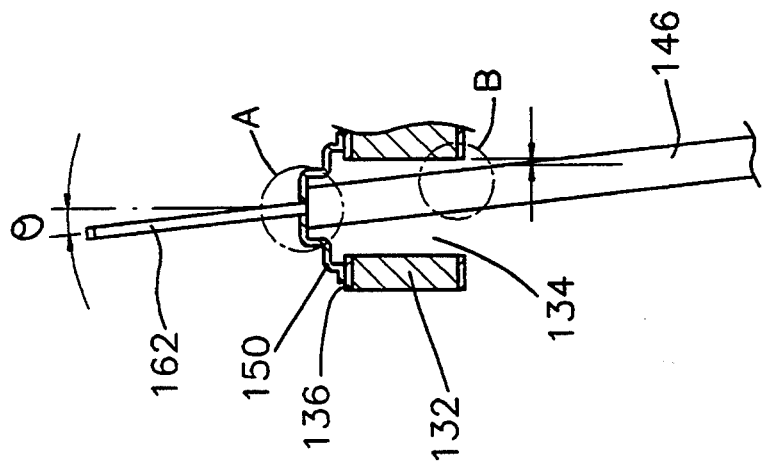
FIG. 7B shows the poor interfacial state generated by the gap "G" between the electrode connector and the separate electrodes.

Further, at an upper portion of through conductors 246 an electrode connection portion 250 is integrally formed. Electrode connection portion 250 performs the role of the electrode connector (50 of FIG. 1 and 150 of FIG. 5) of the prior capacitor. Electrode connection portion 250 is integrally formed by horizontally extending from around fastening tabs 246 in a ring shape so that through conductors 246 are electrically connected with separate electrodes 236 via electrode connection portion 250. Through conductors 246 each integrally provided with electrode connection portion 250 and fastening tabs 262 may be formed by forge using a heading machine or the like.

Insulation tubes 248 are inserted into through holes 234. Fixing through conductors 246 to through holes 234 can be performed by fixing each of electrode connection portion 250 on each of separate electrodes 236 using a proper means such as soldering or the like.

Since each of electrode connection portions 250 is integrally formed with each of through conductors 246, the coinciding the central axis of each of through conductors 246 with the center line of each of through holes 234 may be easily performed.

Figure 12:
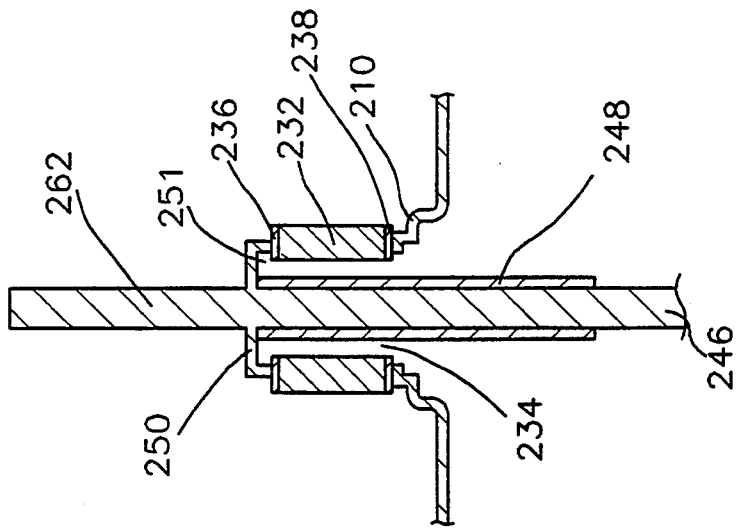
FIG. 12 is a partial sectional view for showing the state that each of the through conductors according to one embodiment of the present invention is fixed on each of separate electrodes.

FIG. 12 is a partial sectional view for showing the state that each of through conductors 246 according to one embodiment of the present invention is fixed on each of separate electrodes 236. As shown in the figure, when fixing each of through conductors 246 of an integral type according to the present invention in which each of through conductors 246 is integrally provided with electrode connection portion 250, the concentricity of each of through conductors 246 with each of through holes 234 and the perpendicularity of electrode connection portion 250 with respect to the center line of through holes 234 can be maintained uniformly.

Figure 13B:
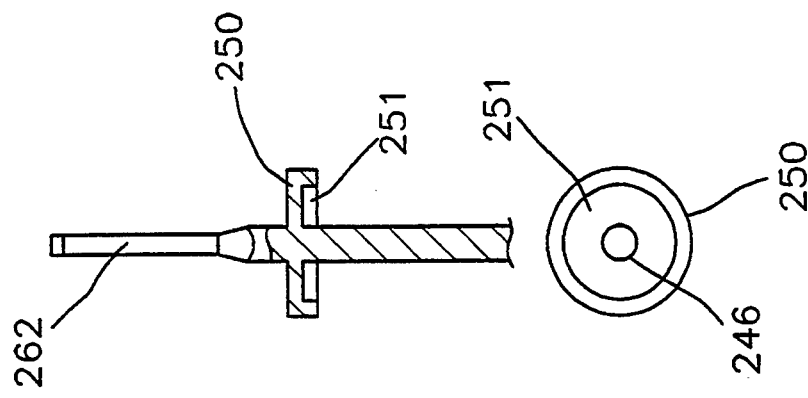
FIG. 13B is a partial sectional view of the upper portion of the through conductor as shown in FIG. 13A
Figure 13C:
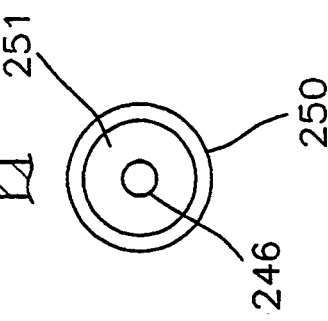
FIG. 13C is a bottom view of the through conductor as shown in FIG. 13A.
Figure 13A:
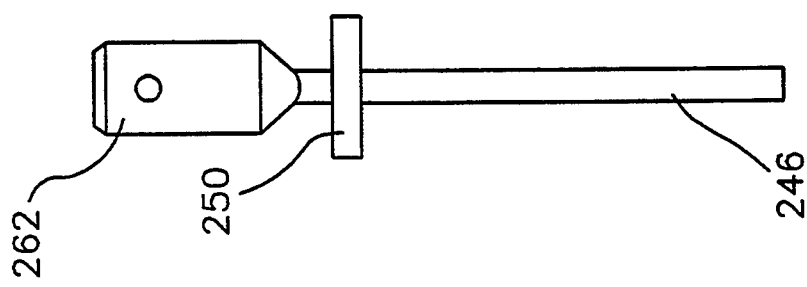
FIG. 13A is a front view of a through conductor as shown in FIG. 12.

FIG. 13A is a front view of a through conductor 246 as shown in FIG. 12, FIG. 13B is a partial sectional view of the upper portion of through conductor 246 as shown in FIG. 13A and FIG. 13C is a bottom view of through conductor 246 as shown in FIG. 13A. As shown in these figures, electrode connection portion 250 is formed at an upper portion of each of through conductors 246 in a ring shape by horizontally extending along the outer periphery of each of through conductors 246. Preferably, at the bottom of electrode connection portion 250, a ring-shaped recessed portion 251 is formed between the outer periphery of electrode connection portion 250 and each of through conductor 246. Forming ring-shaped recessed portion 251 in this way enables an insulation resin material to be stably filed in through holes 234.

Figure 14A:
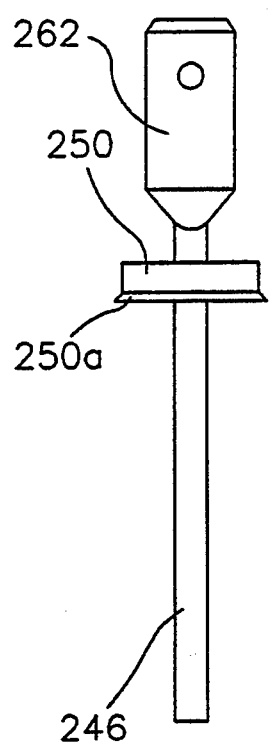
FIG. 14A is a front view of a through conductor according to another embodiment of the present invention.
Figure 14B:
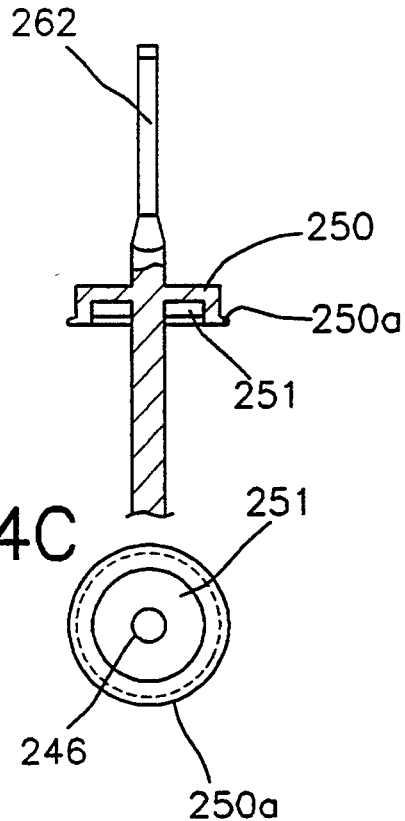
FIG. 14B is a partial sectional view of the upper portion of the through conductor as shown in FIG. 14A
Figure 14C:
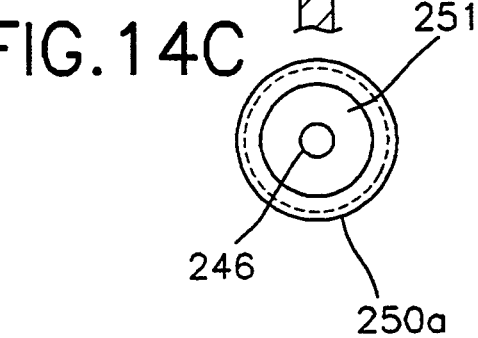
FIG. 14C is a bottom view of the through conductor as shown in FIG. 14A.

FIG. 14A is a front view of a through conductor 246 according to another embodiment of the present invention, FIG. 14B is a partial sectional view of the upper portion of through conductor 246 as shown in FIG. 14A and FIG. 14C is a bottom view of through conductor 246 as shown in FIG. 14A. The through conductor as shown in FIGS. 14A to 14C is the same as shown in FIGS. 13A to 13C except for a bending portion 250a. The same reference numerals in FIGS. 14A to 14C denote the same members as in FIGS. 13A to 13C. Bending portion 250a is formed by being extended from the outer peripheral portion of electrode connection portion 250 having ring-shaped recessed portion 251 at the bottom thereof. Forming bending portion 250a in this way increases the contact surface area between electrode connection portion 250 and each of separate electrodes 236 and improves the stability when fixing through conductors 246.

Capacitor 230 also includes an insulation case 254 and an insulation cylinder 256. The lower portion of insulation case 254 which surrounds ceramic dielectric 232 is secured on projected portion 210, while the upper portion of insulation cylinder 256 which surrounds through conductors 246 is secured in recess 213 of shielding case 201. Insulation case 254 is filled with a first insulation resin 258 such as an epoxy resin so as to cover an outside ceramic dielectric 232 to thereby ensure its moisture proofness and its insulation properties.

Further, the upper portion of insulation cylinder 256 and the space between insulation tubes 248 and the inner surface of through holes 234 are filled with a second insulation material 256 comprised of the same insulation resin material as first insulation resin material 258. Insulation case 254 and insulation cylinder 256 are comprised of a thermoplastic resin such as PBT.

Figure 1:
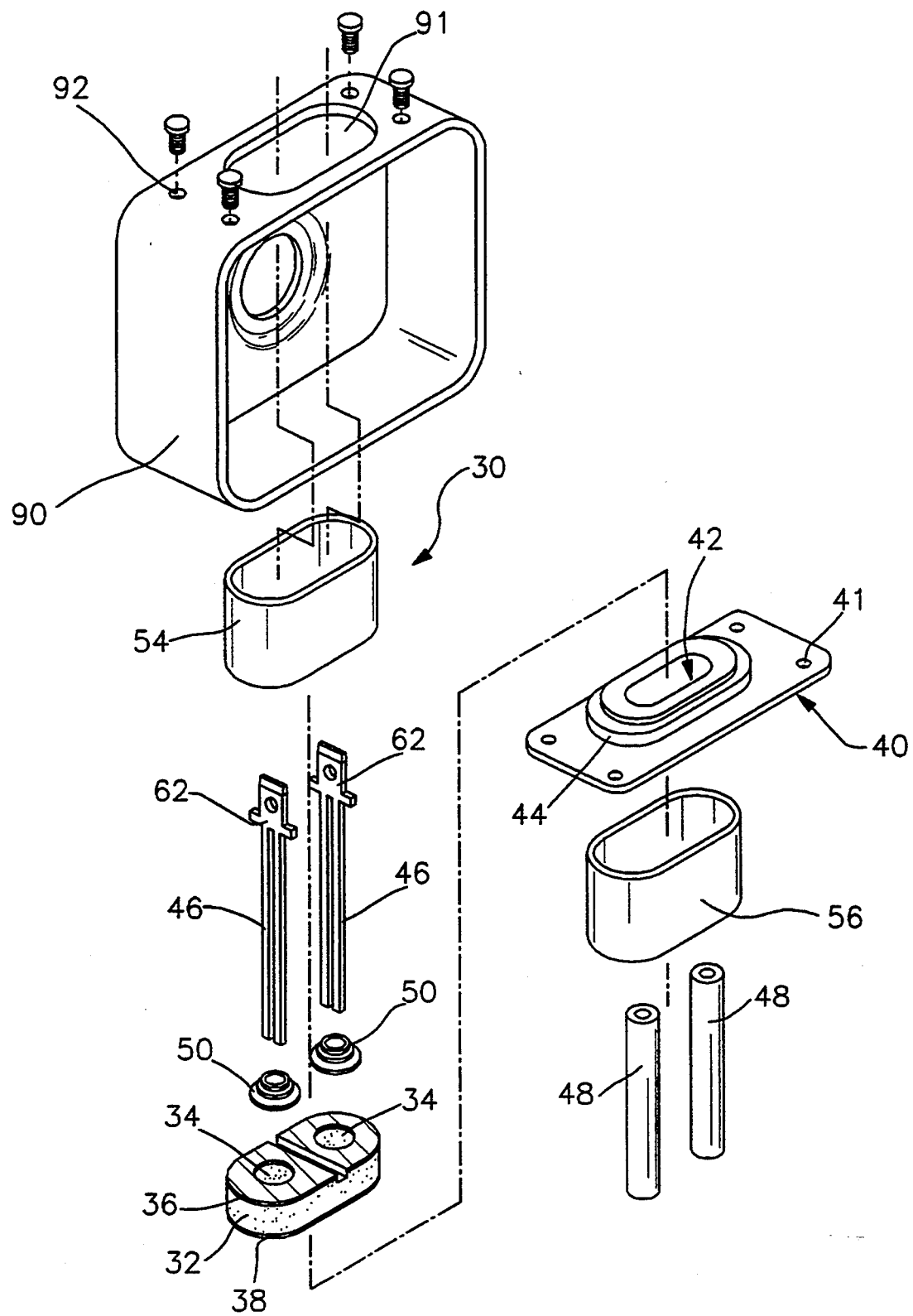
FIG. 1 is an exploded perspective view of a noise shielding apparatus including a conventional through-type capacitor.
Figure 2:
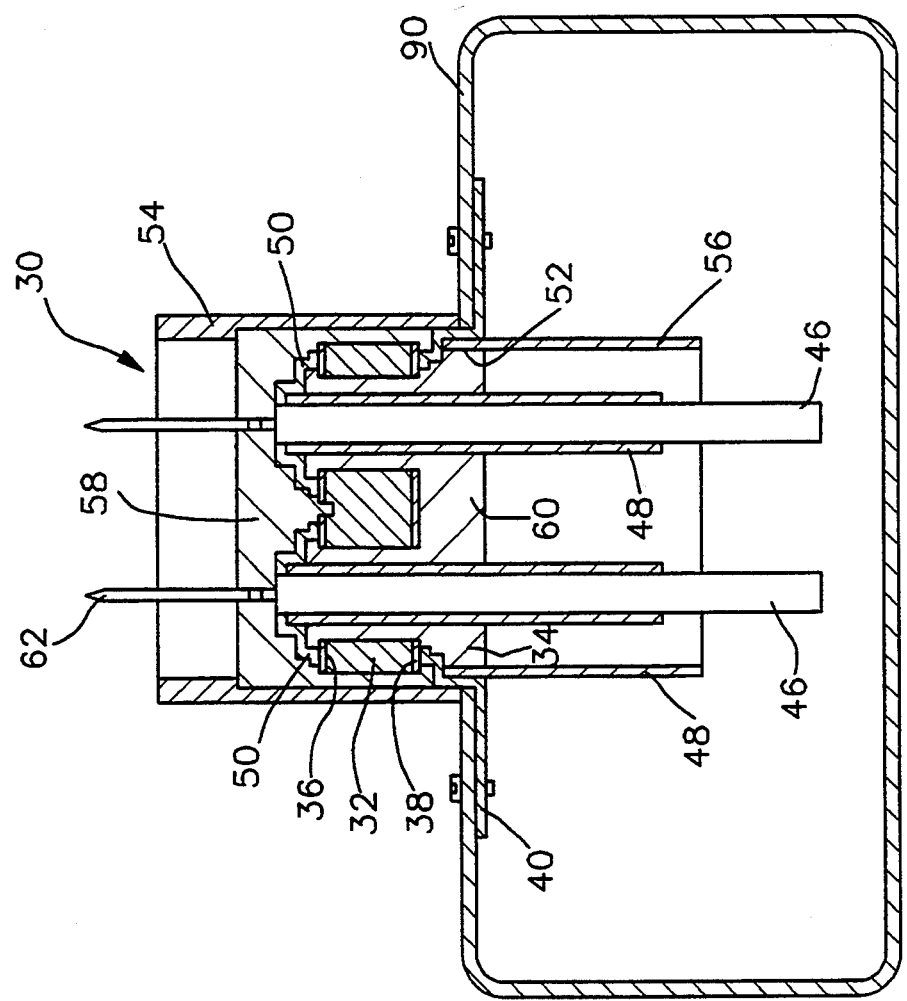
FIG. 2 is a front sectional view of the through-type capacitor of FIG. 1.
Figure 3:
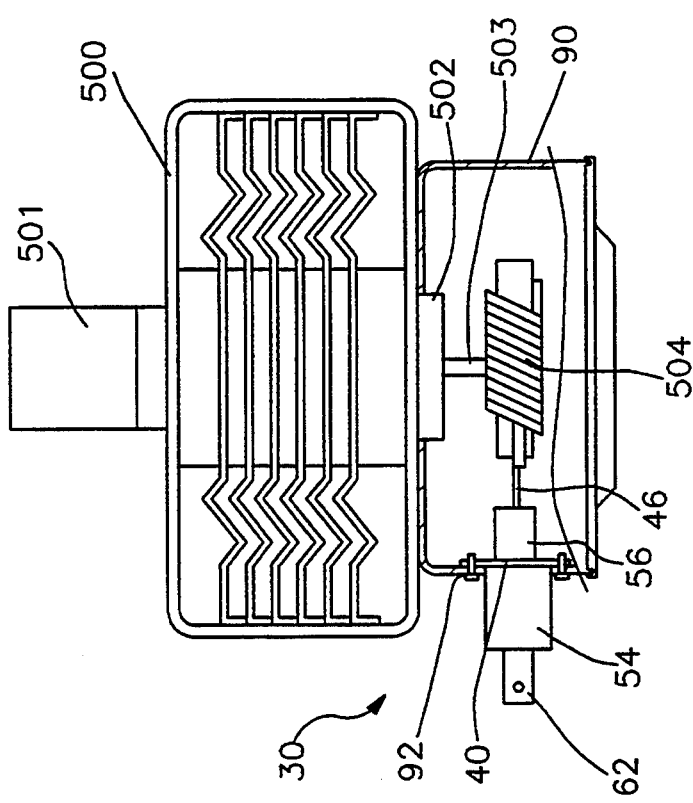
FIG. 3 is a partial sectional view for illustrating a magnetron having a conventional through-type capacitor.
Figure 4:
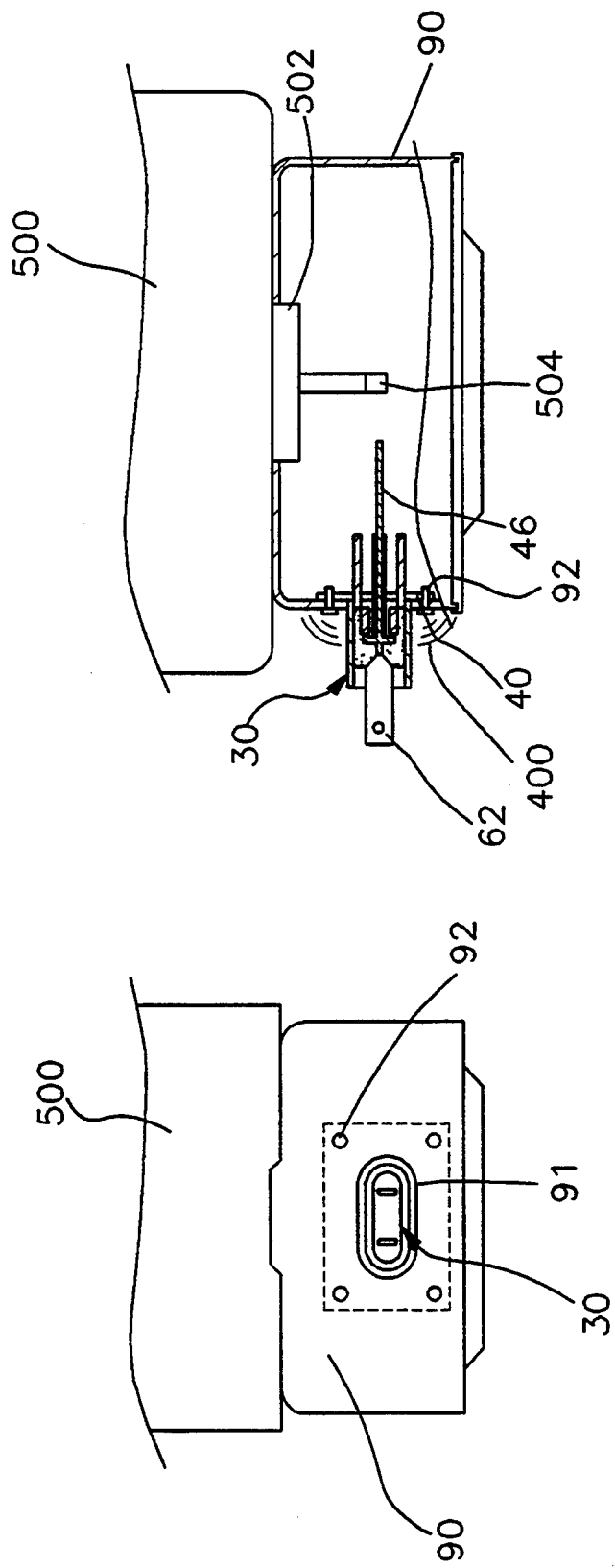
FIGS. 4A and 4B are respectively a partial front view and a partial sectional side view for explaining the noise leakage in a noise shielding apparatus having a conventional through-type capacitor.

In the conventional through-type capacitor as shown in FIGS. 1 and 2, insulation tubes 48 are partially exposed to the outside of second insulation resin material 60. In the present invention, through conductors 248 may be formed in this way. However, when insulation tubes 48 are exposed to the outside of second insulation resin material 60 as in the prior art, moisture may penetrate into the insulation resin material through the gap formed between through conductors 46 and insulation tubes 48. Therefore, in the present embodiment, insulation tubes 248 are preferably made short so that the lower ends thereof is lower than common electrode 238 of ceramic dielectric 232 which is being buried by second insulation resin material 256. Forming insulation tubes 248 in this way enables the insulation resin material to fill the gap between insulation tubes 248 and through conductors 246 so that penetration of the moisture through the gap may be prevented. Therefore, the insulation characteristics of the insulation resin material is improved.

Further, capacitor 230 includes an insulation lattice 261 having a predetermined height at a center upper portion of insulation case 254. Referring to FIG. 11, when first insulation resin material 258 is filled inside insulation case 254, the lower end of insulation lattice 261 is buried by first insulation resin material 258. Insulation lattice 261 is disposed above the border line of separate electrodes 236 and the lower end thereof does not contact with ceramic dielectric 232 and the upper portion thereof is exposed to the outside of insulation case 242 by a predetermined height.

Insulation lattice 261 is disposed between a pair of fastening tabs 262 formed at the upper ends of a pair of through conductors 246. When connecting the wiring tabs provided at the ends of the wires for power supply with fastening tabs 262, insulation lattice 261 effectively prevents the interference between the wiring tabs.

Figure 15:
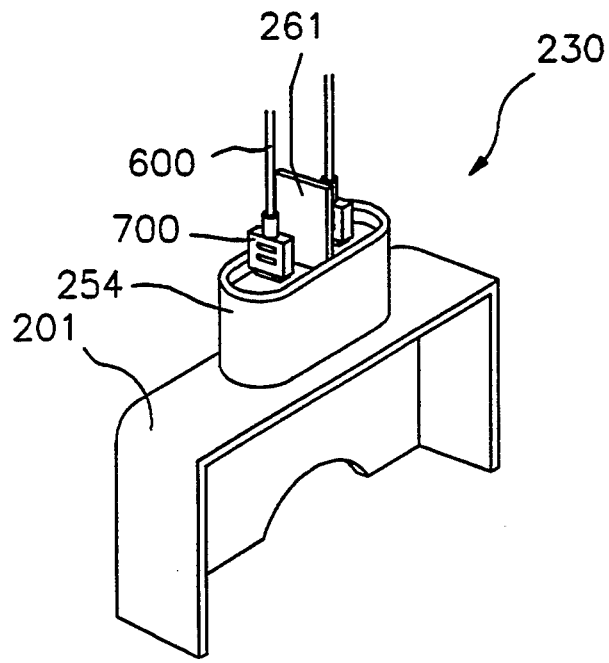
FIG. 15 is a partial perspective view for showing a state that wiring tabs of the wirings for the power supply are connected to a magnetron having a noise shielding apparatus according to one embodiment of the present invention.

FIG. 15 is a partial perspective view for showing a state that wiring tabs 700 of the wirings 600 for the power supply are connected to a magnetron having a noise shielding apparatus according to one embodiment of the present invention.

Providing insulation case 254 with insulation lattice 261 in this way effectively prevent the interference between two tabs 700 of the wirings when connecting tabs 700 with fastening tabs 262. Therefore, two wiring tabs 700 can be safely connected to fastening tabs 262 without the necessity of additional insulation sleeve or housing for insulating these wiring tabs 700. Here, insulation lattice 261 is preferably formed so as to have a predetermined height slightly higher than the top ends of wiring tabs 700. The insulation lattice is preferably comprised of the same material as insulation case 254 so that the insulation lattice and insulation case 254 may be molded simultaneously. However, insulation lattice 261 may be manufactured by using a different insulation material from that of insulation case 254 and then insulation lattice 261 may be adhered to the upper portion of insulation case 254 by using an adhesive.

Figure 16B:
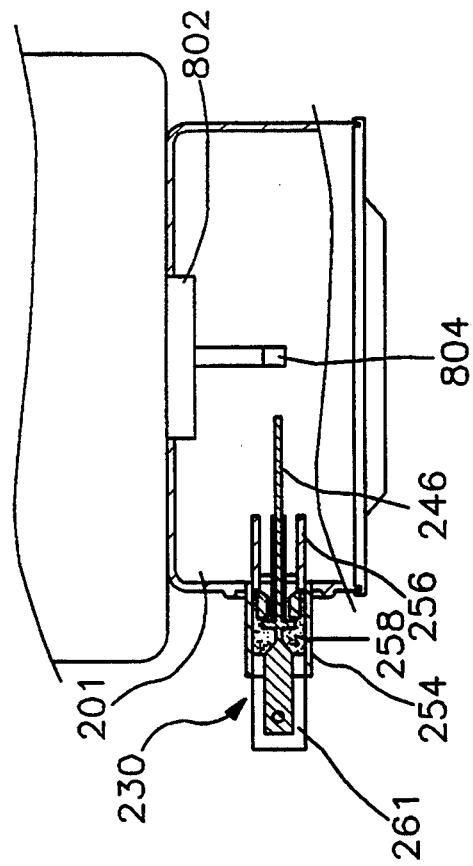
FIGS. 16A and 16B are respectively a partial front view and a partial sectional side view for showing a magnetron wherein a noise shielding apparatus having a through-type capacitor according to one embodiment of the present invention is applied.
Figure 16A:
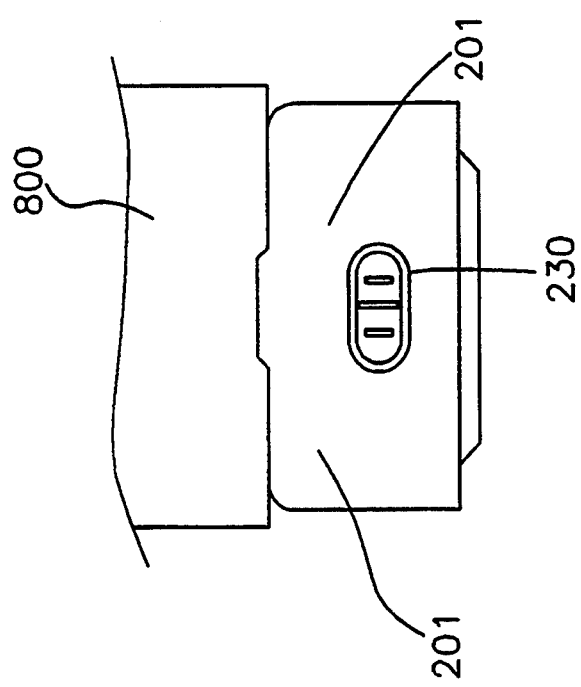

FIGS. 16A and 16B are respectively a partial front view and a partial sectional side view for showing a magnetron wherein a noise shielding apparatus having a through-type capacitor according to one embodiment of the present invention is applied.

In the case where the noise shielding apparatus of the present invention is used, if a microwave noise which is generated from the magnetron flows in reverse, the microwave noise passes through the choke coil which is connected to the filament of the magnetron, cathode stem 802 and cathode terminal 804 with the result that a portion of the noise is offset owing to the reactance of the coil. The rest of the microwave noise passes through through conductors 246 which are connected to the choke coil, and during this passing, a portion thereof is dissipated by the capacitor which includes ceramic dielectric 232 (in which through conductors 246 are inserted). The last remaining portion of the noise is completely dissipated by being grounded to shielding case 201 which is connected with common electrode 238.

In the present invention, shielding case 201 is protrudingly bent so as to form projected portion 210 around opening 211. Projected portion 210 performs the role of the conventional ground fitment (40 in FIG. 1) which is fixedly installed on the shielding case.

Since projected portion 210 effectively performs the role of the conventional ground fitment 40, a separate ground fitment is unnecessary. Therefore, the material cost is saved, and a working process for installing ground fitment 40 is unnecessary, thereby improving the productivity.

Further, in replacement of electrode connector (50 of FIG. 1 and 150 of FIG. 150), electrode connection portion 250 is integrally formed with through conductors 246, which prevents the poor perpendicularity and/or poor interfacial state which arise when assembling a separate electrode connecter with the through conductors. Therefore, the capacitance variance and bad effects on the voltage resistance of the capacitor may be avoided and the assembling work is reduced and the number of the components decreases as well.

Further, providing the insulation lattice solves simply and stably the insulation problem between fastening tabs and thus the magnetron may be stably operated.

The microwave noise which is generated by the magnetron is continuously dissipated by ceramic dielectric 232 during passing through through conductors 246 which are inserted in ceramic dielectric 232. Then, the noise is completely dissipated by being grounded to shielding case 201 which is connected to common electrode 238. In the present invention, when compared to a conventional apparatus, projected portion 210 which performs the role of the conventional ground fitment is integrally formed on shielding case 201. Therefore, the surface of common electrode 238 of ceramic dielectric 232 directly contacts with the surface of projected portion 210, and therefore, the grounding resistance is reduced. Therefore, the microwave noise is effectively grounded to shielding case 201 so as to be completely dissipated.

Further, according to the present invention, the conventional holes for securing ground fitment 40 to shielding case 201 are unnecessary. On the other hand, in the conventional apparatus, when the ground fitment is secured to the shielding case, the shielding case has to be provided with four fastening holes, and therefore, the microwave noise is leaked through the four holes of the shielding case. Therefore, in the present invention unlike the conventional apparatus, there is no possibility that noise may leak through the four holes of the shielding case.

Further, forming reinforcing ribs 212 around projected portion 210 improves the strength of shielding case 201.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A noise shielding apparatus for a magnetron, comprising:
    a shielding case having an elliptic opening on a side wall thereof and a projected portion formed along said elliptic opening by bending out a circumference portion of said elliptic opening, and a recess formed on an inner surface thereof corresponding to said projected portion;
    an elliptic cylindrical ceramic dielectric having a size corresponding to said elliptic opening of said shielding case, and having a pair of through holes;
    a pair of separate electrodes separately formed on an upper surface of said ceramic dielectric;
    a common electrode formed on a lower surface of said ceramic dielectric and oppositely from said separate electrodes;
    a pair of through conductors passing through said through holes and to be connected to a choke coil of the magnetron, each of said through conductors being provided with an electrode connection portion for electrically connecting with said separate electrodes, said electrode connection portion being integrally and horizontally formed from around an upper portion of each of said through conductors;
    an insulation case with a lower portion secured on said projected portion of said shielding case for surrounding said ceramic dielectric; and
    an elliptic insulation cylinder with its upper portion secured in said recess of said shielding case for surrounding said through conductors.

2. The noise shielding apparatus as claimed in claim 1, wherein said electrode connection portion is formed in a ring shape along a periphery of each of said through conductors by horizontally extending from each of said through conductors.

3. The noise shielding apparatus as claimed in claim 2, wherein a recessed portion is formed on a bottom of said electrode connection portion for stably filling into said through holes, said recessed portion being formed between each of said through conductors and an outer periphery of said electrode connection portion.

4. The noise shielding apparatus as claimed in claim 3, said noise shielding apparatus further comprising a bending portion at the outer periphery of said electrode connection portion for increasing a contact area between said electrode connection portion and said separate electrodes and for improving a stable perpendicularity of said through conductors.

5. The noise shielding apparatus as claimed in claim 1, said noise shielding apparatus further comprising an insulation lattice formed at a central upper portion of said insulation case over a border line of said separate electrodes.

6. The noise shielding apparatus as claimed in claim 1, said noise shielding apparatus further comprising a rib formed around said projected portion on said shielding case for reinforcing a strength of said shielding case.

7. The noise shielding apparatus as claimed in claim 1, said noise shielding apparatus further comprising a first insulation resin material filled within said insulation case so as to surround said ceramic dielectric.

8. The noise shielding apparatus as claimed in claim 1, said noise shielding apparatus further comprising a second insulation resin filled in an upper portion of said insulation cylinder so as to surround said through conductors.

9. The noise shielding apparatus as claimed in claim 1, said noise shielding apparatus further comprising fastening tabs formed on an upper portion of each of said through conductors for being connected to an external terminal, and said fastening tabs being extended outside of said insulation case.

10. The noise shielding apparatus as claimed in claim 1, said noise shielding apparatus further comprising a pair of insulation tubes surrounding a pair of said through conductors, respectively.

11. A noise shielding apparatus for a magnetron, comprising:
    a shielding case having an elliptic opening on a side wall thereof and a projected portion formed along said elliptic opening by bending out a circumference portion of said elliptic opening, and a recess formed on an inner surface thereof corresponding to said projected portion;

an elliptic cylindrical ceramic dielectric having a size corresponding to said elliptic opening of said shielding case, and having a pair of through holes;

a pair of separate electrodes separately formed on an upper surface of said ceramic dielectric;

a common electrode formed on a lower surface of said ceramic dielectric and oppositely from said separate electrodes;

a pair of through conductors passing through said through holes and to be connected to a choke coil of the magnetron, each of said through conductors being provided with an electrode connection portion for electrically connecting with said separate electrodes, said electrode connection portion being integrally and horizontally formed from around an upper portion of each of said through conductors, said electrode connection portion having a recessed portion formed on a bottom of said electrode connection portion for stably filling into said through holes, said recessed portion being formed between each of said through conductors and an outer periphery of said electrode connection portion;

an insulation case with a lower portion secured on said projected portion of said shielding case for surrounding said ceramic dielectric;

an elliptic insulation cylinder with its upper portion secured in said recess of said shielding case for surrounding said through conductors;

a first insulation resin material filled within said insulation case so as to surround said ceramic dielectric;

a second insulation resin filled in an upper portion of said insulation cylinder so as to surround said through conductors;

fastening tabs formed on an upper portion of each of said through conductors for being connected to an external terminal, and said fastening tabs being extended outside of said insulation case; and a pair of insulation tubes surrounding a pair of said through conductors, respectively.

12. The noise shielding apparatus as claimed in claim 11, wherein said insulation tubes are buried with said second insulation resin material.

13. The noise shielding apparatus as claimed in claim 11, said noise shielding apparatus further comprising an insulation lattice formed at a central upper portion of said insulation case over a border line of said separate electrodes.

14. The noise shielding apparatus as claimed in claim 13, wherein a lower end of said insulation lattice is buried with said first insulation resin material.

15. The noise shielding apparatus as claimed in claim 13, wherein said insulation lattice is formed between a pair of said fastening tabs so as to have an upper end with a height higher than a height of said fastening tabs.

* * * * *